N. C. HAMMELL.
FURROWING OUT CORN GROUND.

No. 188,624. Patented March 20, 1877.

Witnesses: Inventor:

UNITED STATES PATENT OFFICE.

NATHAN C. HAMMELL, OF BROWN TOWNSHIP, MIAMI COUNTY, OHIO.

IMPROVEMENT IN FURROWING OUT CORN-GROUND.

Specification forming part of Letters Patent No. 188,624, dated March 20, 1877; application filed May 20, 1876.

*To all whom it may concern:*

Be it known that I, NATHAN C. HAMMELL, of Brown township, in the county of Miami and State of Ohio, have invented a new and useful Improvement in Furrowing out Corn-Ground, which improvement is fully set forth in the following specification, reference being had to the accompanying drawing.

Figure 1:
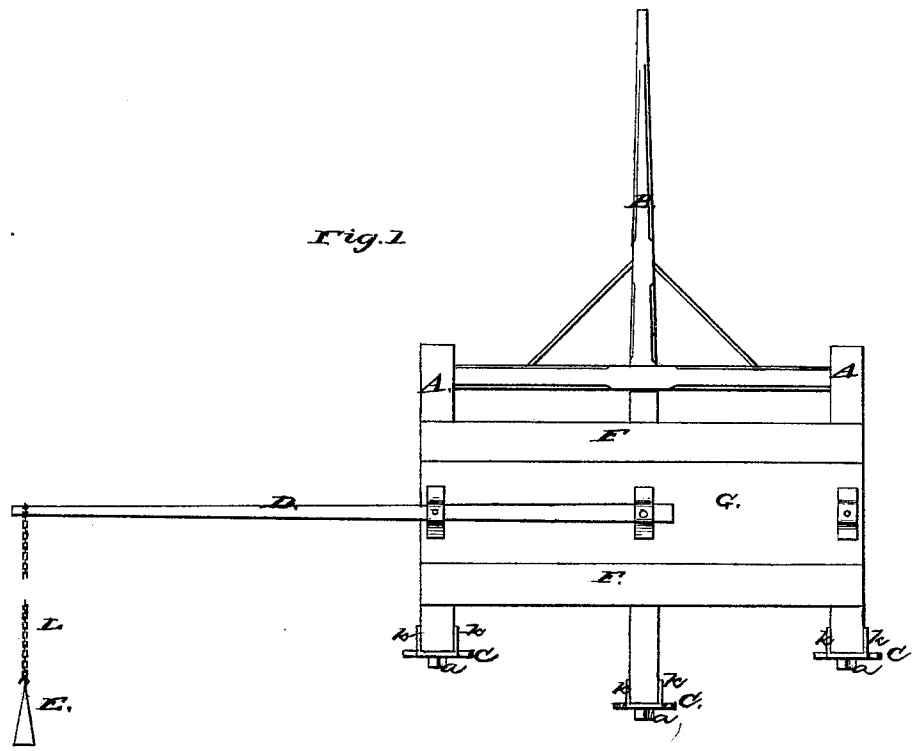
Figure 2:
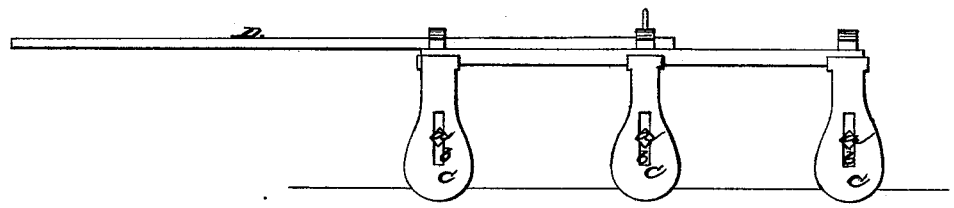
Figure 3:
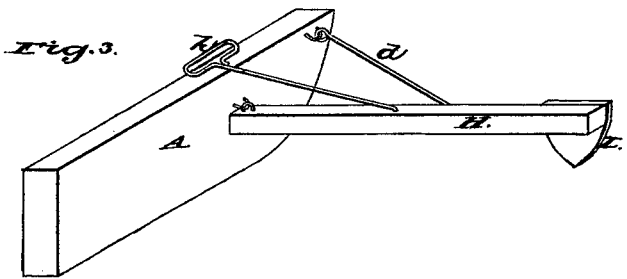

Figure 1 is a top view. Fig. 2 is a rear view. Fig. 3 is a detail view.

Referring to the drawing, A A A are runners, forming a furrower or sled for marking out corn-ground. These runners are securely connected together by cross-bars F F. To the runners, at their rear ends, by bolts, are adjustably attached furrowing teeth or plows C C C, (having side guides $k$, that embrace the runners,) provided with slots $b$, through which bolts $a$ are passed for securing them to the said runners, for graduating the depth of the furrow. To one side of the frame and to the runner is hinged a bar, H, carrying a furrowing-tooth, I, braced by a rod, $d$, extending from the runner A to the bar H. The bar H is provided with a handle, $h$, that extends within reach of the operator, to enable him to elevate the bar in passing obstructions.

A staple or other suitable retaining device may be attached to one of the cross-bars F, through which the handle $h$ is passed and held when the furrowing-bar H is adjusted in turning at the end of rows, passing obstructions, or transporting the machine from place to place.

In place of the hinged bar H and furrowing-tooth I, a bar, D, chain L, and weight E may be used, the bar D being adjustable in guides.

Having described my invention, what I claim is—

In combination with the furrowing-shoes A, the slotted teeth C, provided with guides $k$, and adjustably secured to the rear ends of said runners by bolts $a$, substantially as described, and for the purpose set forth.

NATHAN C. HAMMELL.

Witnesses:
 WILLIAM L. GRAHAM,
 GEORGE M. COX.